(12) United States Patent
Marler et al.

(10) Patent No.: US 7,142,825 B2
(45) Date of Patent: Nov. 28, 2006

(54) METHOD AND APPARATUS FOR ENABLING DUAL CONTROL HEAD OPERATION OF A MOBILE RADIO TRANSCEIVER

(75) Inventors: Eric Scott Marler, Redding, CA (US); Alexander Thomas Sublette, Redding, CA (US)

(73) Assignee: Marler Communications, Inc., Redding, CA (US)

( * ) Notice: Subject to any disclaimer, the term of this patent is extended or adjusted under 35 U.S.C. 154(b) by 501 days.

(21) Appl. No.: 10/354,502

(22) Filed: Jan. 29, 2003

(65) Prior Publication Data

US 2004/0147231 A1   Jul. 29, 2004

(51) Int. Cl.
*H04B 1/38* (2006.01)
(52) U.S. Cl. ............... 455/90.1; 455/90.2; 455/90.3
(58) Field of Classification Search ......... 455/3.05, 455/404.1, 404.2, 418, 419, 420, 500, 507, 455/521, 90.2, 90.3, 557, 88, 66.1, 74, 355
See application file for complete search history.

(56) References Cited

U.S. PATENT DOCUMENTS

| | | | | |
|---|---|---|---|---|
| 5,020,135 A | * | 5/1991 | Kasparian et al. | 455/76 |
| 5,369,783 A | * | 11/1994 | Childress et al. | 455/17 |
| 5,414,858 A | * | 5/1995 | Hoffman et al. | 710/48 |
| 5,420,860 A | * | 5/1995 | Stevens et al. | 370/263 |
| 5,539,452 A | * | 7/1996 | Bush et al. | 348/14.13 |
| 6,112,224 A | * | 8/2000 | Peifer et al. | 709/202 |
| 6,157,951 A | * | 12/2000 | Vasa | 709/223 |
| 2005/0125088 A1 | * | 6/2005 | Bowden et al. | 700/94 |

* cited by examiner

*Primary Examiner*—Duc Nguyen
*Assistant Examiner*—Justin Lee
(74) *Attorney, Agent, or Firm*—Nixon Peabody LLP

(57) ABSTRACT

An apparatus and corresponding method for enabling the use of a plurality of control heads for operating a transceiver designed to operate with a single control head via a data bus. An interface module is connected between the transceiver and the plurality of control heads that periodically generate an interrupt request. The interface module, responsive to the interrupt requests, selectively enables one of the control heads to operate the radio transceiver. The method includes polling communication from the control heads and transceiver for mediating control of the transceiver. In one embodiment, accessibility of the radio system is improved and cost reduced by utilizing the speaker and volume control of each control head, such that an external speaker is not required.

2 Claims, 14 Drawing Sheets

METHOD AND APPARATUS FOR ENABLING DUAL CONTROL HEAD OPERATION OF A MOBILE RADIO TRANSCEIVER

FIELD OF INVENTION

The present invention relates to mobile radio systems having a control head for operating a radio transceiver, and more particularly to a method and apparatus for enabling dual control head operation of a radio transceiver designed for use with a single control head.

BACKGROUND OF THE INVENTION

Mobile radios are often used in applications where it is highly desirable for more than one user to operate a single radio transceiver. Public safety organizations, such as firefighters and paramedics, rely on mobile radios in their emergency vehicles to allow the occupants to perform a number of tasks critical to their life saving work. For instance, for a paramedic team in a mobile trauma unit vehicle, the paramedic/driver of the vehicle needs control of the radio to communicate with a dispatcher directing the unit to the location of the trauma patient and to the available hospital. Once a patient is onboard the vehicle, the paramedics performing treatment in the patient area need control of the mobile radio to rapidly notify the hospital of the condition of the trauma patient and to consult with an emergency room physician to obtain orders regarding patient treatment. Similarly, a firefighter/driver and the commander-in-charge setting up a command post at the scene of a fire both need control of the mobile radio from different locations in order to rapidly and effectively perform their life saving tasks. It is thus desirable to have a radio system having the capability for two individuals in separate locations to operate a single radio transceiver.

Mobile radios are typically operated through use of a control head that is remotely connected to a radio located in the vehicle. Known higher tier mobile radio transceivers support dual control head capability. This dual control head capability enables two heads to operate a single radio transceiver. FIG. 1 shows schematically an exemplary known higher tier radio system designed for use with two control heads. Mobile radio system 10 has a radio transceiver 12 coupled to two control heads 14, 16 via a bus 26. Bus 26 is preferably a digital data bus. Radio systems such as system 10 also provide analog voice communication on an analog bus (not shown), such voice communication and bus being known to one of ordinary skill in the art. Control heads 14, 16 are provided for operating the transceiver 12. Preferably, control heads 14, 16 are identical units. Each of the control heads 14, 16 includes a display 20 for presenting the status of the transceiver 12 to a user. The display 20 is preferably an LCD type that provides a presentation to a user of alphanumeric characters and graphic symbols (e.g., the selected radio channel number and status icons). Each control head also provides a control to enable a user to selectively change the backlighting of the LCD display according to the user's preference for the ambient light conditions. Control heads 14, 16 also typically include a plurality of controls for user management of functions of the transceiver 12 (e.g., entry buttons 22 and on/off/volume control knob 18 shown in FIG. 1). Buttons 22 may be programmable in the radio to serve certain user defined functions. Control heads 14, 16 also typically include a plurality of LED indicators and additional buttons, such as channel selector buttons (not shown for the exemplary control heads in FIG. 1).

As shown in FIG. 1, an input device 24 may be attached to an audio input jack of the control heads 14, 16 for enabling voice communication. Input device 24 is typically a microphone, a microphone/keypad combination, or a telephone style handset. In alternate embodiments, each control head may have a different type of input device 24, which is preferably a wired device, but alternately may be wireless. Control heads 14, 16 include an integrated audio speaker 28. The input device 24 may also provide a microphone and an audio speaker integrated as part of a handset. The input device is typically enabled only for half-duplex operation by a user. This half-duplex operation provides a listen-only mode and a talk mode such that a user can talk or listen using the device, but cannot do both at the same time. A push-to-talk button (PTT) (not shown) is typically provided on the input device 24 to select between these modes.

A speaker privacy mode feature may also be provided wherein a hookswitch control is provided on input device 24. For example, an operator using a telephone style handset for input device 24 can activate this privacy mode to enable the operator to listen to incoming audio on the handset speaker in privacy since the speaker on the control head is muted. Various other features are typically provided by the radio system and are known to one of ordinary skill in the art.

A drawback of the higher tier system shown in FIG. 1 is the significantly higher cost of a transceiver in this system compared to the cost of a lower tier mobile radio transceiver designed for use with a single head. FIG. 2 shows an exemplary lower tier mobile radio system designed for use with a single control head. As shown, a radio system 30 has a transceiver 32 coupled to a control head 14 via a digital data bus 34. A drawback of known lower tier systems is that these systems are designed to inhibit the use of more than one control head to operate the transceiver.

Radio system 30 also provides for sending audio communications to and from a user of the control head (e.g., voice communication from a user speaking into a microphone included in input device 24). The voice communication signals are typically coupled by means (e.g., analog signal bus) that is separate from data bus 34, between the control head 14 and transceiver 30. Alternatively, the voice communication signals could be converted to a suitable digital form prior to signal distribution.

Municipalities and other mobile radio purchasers typically have limited budgets for the purchase of needed mobile radio systems, so these purchasers need to receive the required radio system capability at an economical cost. Owners of a radio transceiver designed for operation with a single control head often desire to add dual control head capability without having to purchase a new radio transceiver. What is needed is a cost efficient method and apparatus to enable dual control head operation in a radio system designed to operate with one control head Older mobile radio systems typically utilized analog communication between a radio transceiver and the control head. In modern mobile radio systems, most of the signal functions previously carried via analog electrical signals are currently being encoded into a digital format for communication on a digital bus between microprocessor controllers in the control head and the radio transceiver. This digital communication is typically encoded for particular protocols.

What is needed is a method and apparatus for connecting two control heads to the same digital bus without disrupting communications.

The control heads in a radio system utilizing digital communication typically each sends an interrupt service request ("interrupt") in response to user actions performed at the control head. Higher tier dual control head radio systems are typically designed to handle this multiple interrupt environment internally by programming the microprocessor software to support two control heads. What is needed is method and apparatus providing an interface module, coupled between a radio transceiver designed for use with single control head and two control heads, to mediate communication between these devices, such that each of the control heads is selectively enabled to operate the radio transceiver.

The control heads of mobile radio systems typically include a volume control (e.g., a knob on the head) for adjustment of the volume level and an audio speaker built into the head. Known radio systems may optionally provide a telephone-style handset or other device having an integrated speaker and being connected directly to the control head to enable voice communication. A drawback of a known higher tier mobile radio system having two control heads is that the system requires an additional external amplified speaker, having a volume control mounted thereon, to provide audio for one of the two control heads. For this known system, the audio fed to this external speaker's amplifier is derived from a constant level audio source. A user of this known system must access the area where this speaker is mounted, external to the control head, in order to control the volume of audio for one of the control heads. What is needed is a method and apparatus for a dual control head radio system that utilizes the volume controls and speaker integrated with each control head such that any additional speakers are not required. A user might desire having the option to add an external speaker for the control head. What is also needed is a system enabling use of this optional external speaker while allowing the audio level of this speaker to be adjusted by the corresponding control head volume control knob.

SUMMARY OF THE INVENTION

The present invention solves the above identified problems of known devices and methods by providing a reduced cost method and apparatus to enable dual control head operation in a low cost radio system designed to operate with one control head.

Broadly stated, the present invention is directed to, in a radio system including a transceiver designed to operate with a single control head via a digital data bus, a method for enabling the use of a plurality of control heads for operating the transceiver, each of the control heads periodically generating an interrupt request signal, comprising the steps of connecting an interface module between said transceiver and said plurality of control heads; detecting in the interface module when one control head has generated an interrupt request; and causing the interface module to selectively enable the control head that generated the interrupt request to operate said transceiver.

The present invention is also directed to an interface module apparatus that enables the use of a plurality of control heads in a radio system designed for use with a single head. The present invention also provides a method for connecting two control heads to the same bus without disrupting communications. The present invention has the additional advantage of providing a method and apparatus providing an interface module, connected between a radio transceiver designed for use with a single head and two control heads to mediate communication therebetween, such that each of the control heads is selectively enabled to operate the radio transceiver.

Another advantage of the present invention is that it provides a method and corresponding apparatus for a dual control head radio system that does not require any additional external speakers. Still another advantage of the present invention is that it enables use of an optional additional external speaker while allowing the audio level of an external speaker to be adjusted by the control head volume control knob, rather than by the control on that speaker.

BRIEF DESCRIPTION OF THE DRAWINGS

The forgoing aspects and the attendant advantages of the present invention will become more readily appreciated by reference to the following detailed description, when taken in conjunction with the accompanying drawings, wherein:

FIGS. 7A–7I are flow charts illustrating exemplary details for an implementation of the method of FIG. 6 according to an embodiment of the present invention.

DETAILED DESCRIPTION OF THE INVENTION

Figure 2:
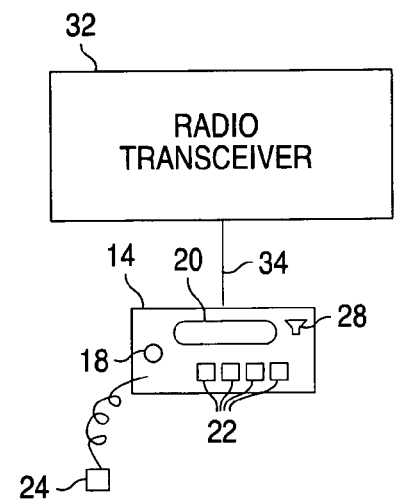
FIG. 2 shows an exemplary mobile radio system designed for use with a single control head.
Figure 3:
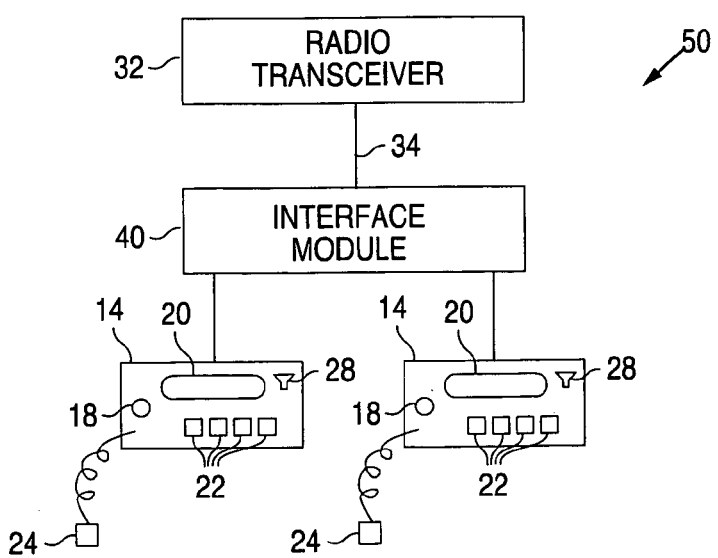
FIG. 3 is a schematic diagram illustrating a mobile radio system including the interface module according to a preferred embodiment of the present invention.

The present invention will now be described in more detail with reference to FIGS. 3–8. FIG. 3 illustrates a mobile radio system including the interface module according to a preferred embodiment of the present invention. As shown in FIG. 3, a mobile radio system 50 comprises an interface module 40 connected between a radio transceiver 32 and two control heads 14, 16. Transceiver 32, also shown in FIG. 2, is designed to operate with only a single control head 14 via a bus 34. Transceiver 32 typically does not enable, and may inhibit the coupling of another control head to the bus 34. The interface module and the corresponding method according to an embodiment of the present invention overcomes this drawback of transceiver 32 by enabling control heads 14, and 16 to both selectively operate transceiver 32. As shown schematically in FIG. 3, in system 50, the control heads 14, 16 are identical and connect to the interface module 40. The present invention is not limited to these exemplary control heads shown, any suitable control heads may be connected to the interface module of the present invention for operation of a corresponding transceiver. Although an input device 24 is shown physically connected to each of the control heads 14, 16, alternatively the device may be connected to the control head using suitable wireless means.

Interface module 40 in the radio system 50 connects between the transceiver 32 and a plurality of control heads 14, 16, each of the plurality of control heads periodically generating an interrupt request. The interface module 40 acts in response to these interrupt requests to selectively enable one of the control heads 14, 16 to operate the transceiver 32, as described in more detail below.

Figure 1:
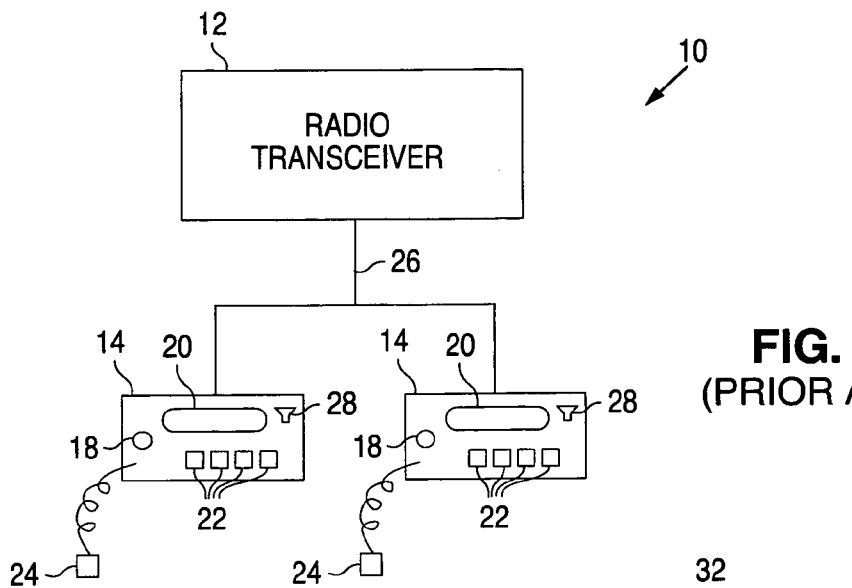
FIG. 1 illustrates an exemplary higher tier radio system designed for use with two control heads.
Figure 4:
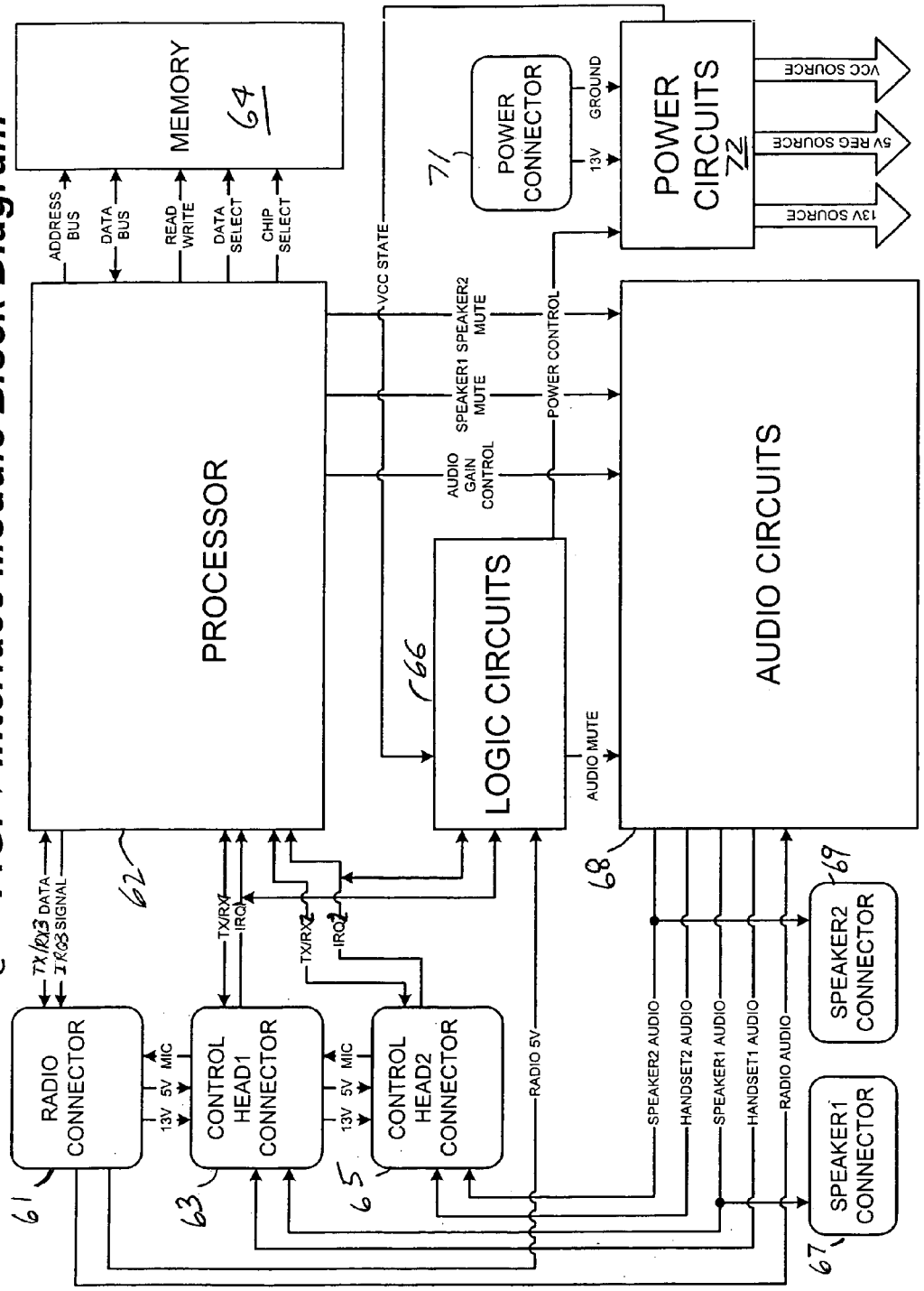
FIG. 4 is a block diagram of the interface module according to an exemplary embodiment of the present invention.

FIG. 4 is a block diagram of an interface module according to an exemplary preferred embodiment of the present invention. Interface module 60 shown in FIG. 4 is an exemplary embodiment of the interface module 40 for the radio system 50 shown in FIG. 3. Interface module 60 includes a radio connector 61, a control head1 connector 63, and a control head2 connector 65 for physically connecting the interface module 60 to the radio transceiver 32 and control heads 14, 16 respectively. The control heads typically include an integrated audio speaker (shown schematically as 28 if FIG. 1). In an alternate embodiment, optional external speakers (not shown) are added for either or both of the control heads 14, 16 shown in radio system 50 in FIG. 3. Interface module 60 includes a speaker1 connector 67 and a speaker2 connector 69 for connection to these optional external speakers.

Figure 8:
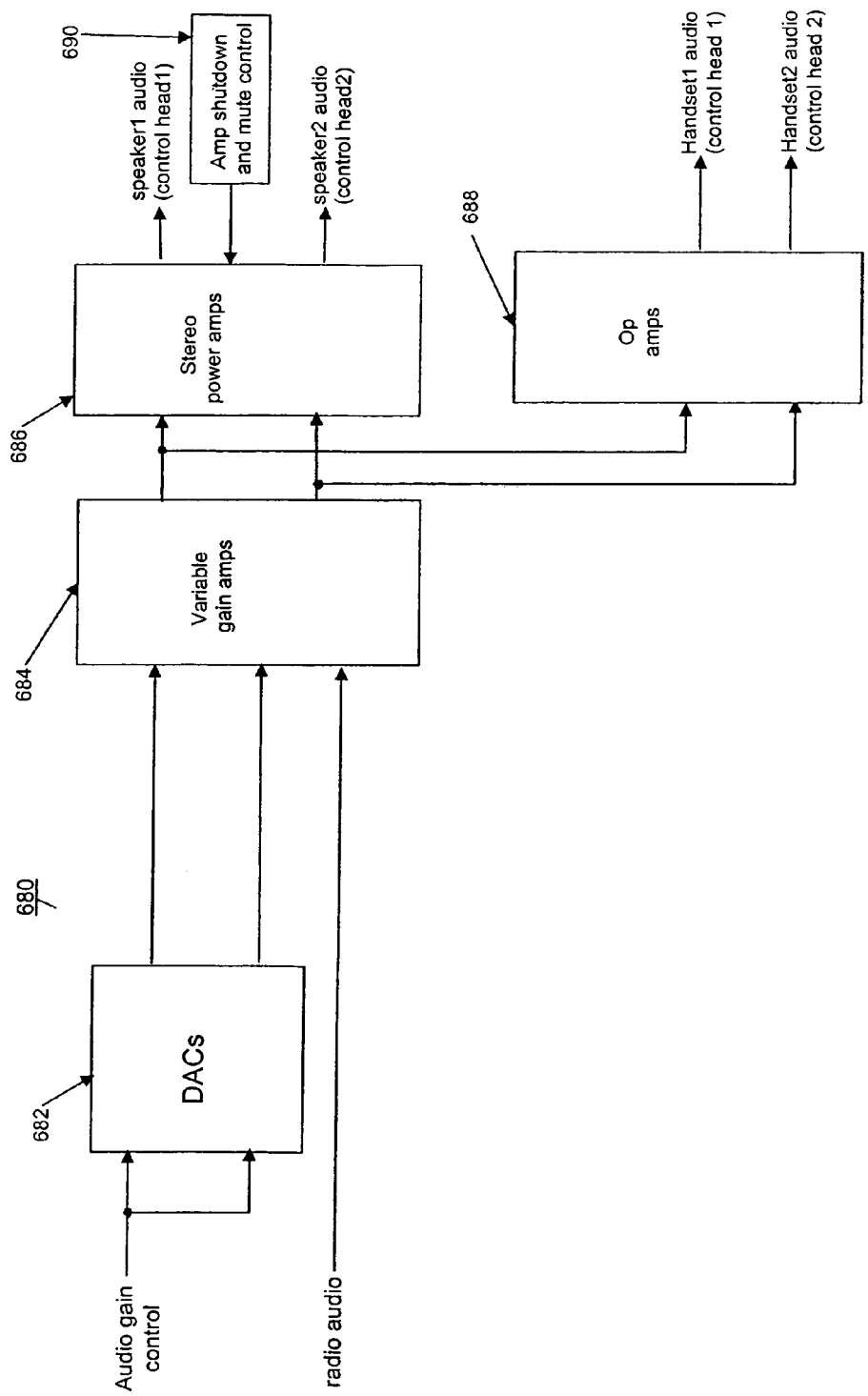
FIG. 8 is a block diagram of an embodiment of the audio circuit of the interface module in FIG. 4.

Interface module 60 also preferably includes audio circuits module 68 and corresponding software code processing control of the audio level for the audio speakers associated with each control head. Control is also provided for a speaker in a handset that may be connected to the control head, e.g., as input device 24 in FIG. 3. As shown in FIG. 4, radio audio from the transceiver is coupled to audio circuits module 68. FIG. 8 is a block diagram of a preferred embodiment 680 of the audio circuits module 68. As shown in FIG. 8, the audio circuits module 680 also includes dual channel digital-to-analog converters (DACs) 682 and a dual dc-gain-controlled amplifier stage comprising variable gain amps 684 and stereo power amps 686 for providing control of the audio level to each control head speaker. Op amps 688 are included in the audio circuits module 680 for providing control for the audio for a handset that may be connected to each control head. The audio mute and speaker mute signals and corresponding control in FIG. 4 are shown in the FIG. 8 as the "amp shutdown and speaker mute control" block 690. As can be seen in FIG. block 690 is not connected to the op amps 688 such that a speaker privacy mode is provided wherein the control head audio speaker is muted and the corresponding handset audio speaker is not muted. Preferably, the output of the DACs 682 is sent to the amplifier stage in response to changes in the position of a volume control knob for the active control head. Interface module 60 includes logic circuits module 66 that provides for muting of the audio amplifier during power initialization (amp shutdown shown in FIG. 8) and other control for power initialization.

As shown in the embodiment in FIG. 4, a source of power is provided to the interface module 60 via power connector 71. This input power is coupled and processed by power circuits 72 for distribution as shown in the exemplary embodiment in FIG. 4. As shown in FIG. 4, a "radio 5V" signal, indicative of the radio transceiver being powered up, is coupled from the radio transceiver, via radio connector 61, to the logic circuits module 66. The logic circuits module 66 and power circuits module 72 provide for powering up the interface module when this "radio 5V" signal is detected or when a "power" button (e.g., an On/Off/Volume Control button) is pressed at either of the control heads. Based on the figures and description included herein, the logic circuits module 66 and power circuits module 72 would be obvious to one of ordinary skill in the art.

In the preferred embodiment shown in FIG. 4, interface module 60 includes a microprocessor 62 controlled by software code. For support of the processor 62, interface module also includes a memory module 64 preferably having RAM and ROM memory and the corresponding memory control logic. Preferably, the processor 62 is a 68302 integrated multi-protocol (IMP) communications controller. One of ordinary skill in the art would recognize that the 68302 is formed by a combination of a 68000 microprocessor core and a communications controller. It is also known to one of ordinary skill that communication controllers of this type provide DMA control, timers, and other elements as part of the communications architecture.

Figure 5:
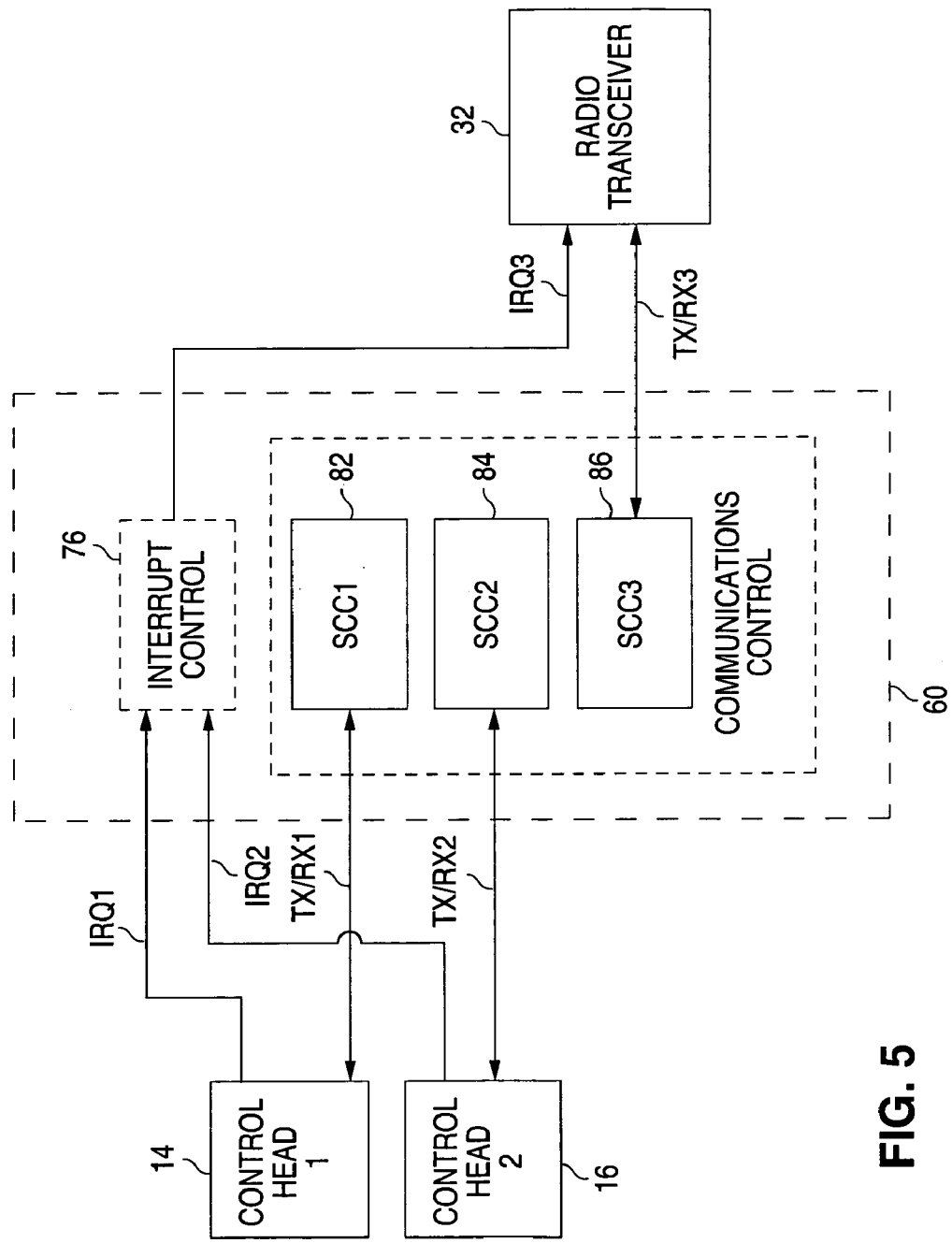
FIG. 5 is a block diagram illustrating digital data and interrupt request signal flow between the interface module of FIG. 4 and the transceiver and control heads.

In a radio system, interface module 60 shown in FIG. 4 connects between a transceiver and a plurality of control heads. Two control heads are preferably used for the present invention. Further details regarding the interface module 60 and, in particular, the flow for the digital transmit/receive (TX/RX) data and interrupt service request (IRQ) signals between the interface module 60, the transceiver 32, and control heads 14, 16 are illustrated in FIG. 5. Each of the control heads periodically generating an interrupt service request (IRQ). In FIGS. 4 and 5, these interrupt service requests are identified as signals IRQ1 and IRQ2 sent from a control head 1 and a control head 2 respectively. Preferably, the interrupt service request is set to a high level to indicate that the interrupt service request is active. The interface module 60 acts in response to these interrupt requests to mediate and arbitrate control of the system such that a selective one of the control heads 14, 16 is enabled to operate the transceiver 32. An interrupt service request signal required for the radio transceiver 32 is identified as IRQ3. This IRQ3 signal is transmit from the interface module processor 62 via a radio connector 61 coupled therebetween. The interface module, signals and operation are described in more detail below.

As shown in FIG. 5, interface module 60 includes an interrupt control module 76 and a communications control module 78. Referring back to FIG. 4, these modules comprise hardware and software for processor 62. FIG. 5 only shows elements to represent the digital signal flow between the elements; the other elements of the interface module are preferably as shown in the embodiment in FIG. 4. Communication is preferably serial communication in accordance with the UART serial data bus, a standard known to one of ordinary skill in the art.

The processor 62 in FIG. 4 provides three Serial Communications Controllers (SCC) for the interface module 60, identified as 82 ("SCC1'"), 84 ("SCC2"), and 86 ("SCC3") in FIG. 5. Each of these SCCs corresponds to a serial communication channel, numbered 1–3 respectively. As shown in FIG. 5, SCC1 82 provides a serial channel controller for a serial channel 1, identified as Tx/Rx1, between the first control head 14 and the interface module 60. SCC2 84 provides a serial channel controller for a serial channel 2, identified as Tx/Rx2, between the second control head 16 and the interface module 60. Similarly, SCC3 86 provides a serial channel controller for a serial channel 3, identified as Tx/Rx3, between the radio transceiver 32 and the Interface Module 60. Although not shown, it is apparent to one of ordinary skill in the art that the combined Transmit/Receive signals shown schematically in FIG. 5 are preferably split into separate signals for input to the SCCs.

The method and corresponding interface module apparatus according to the preferred embodiment of the present invention polls each of the three serial communication channels for data ready to be transferred and mediates interrupt service requests from the control heads. The operation will be described in more detail below with reference to the flow charts for the method according to embodiments of the present invention.

Figure 6:
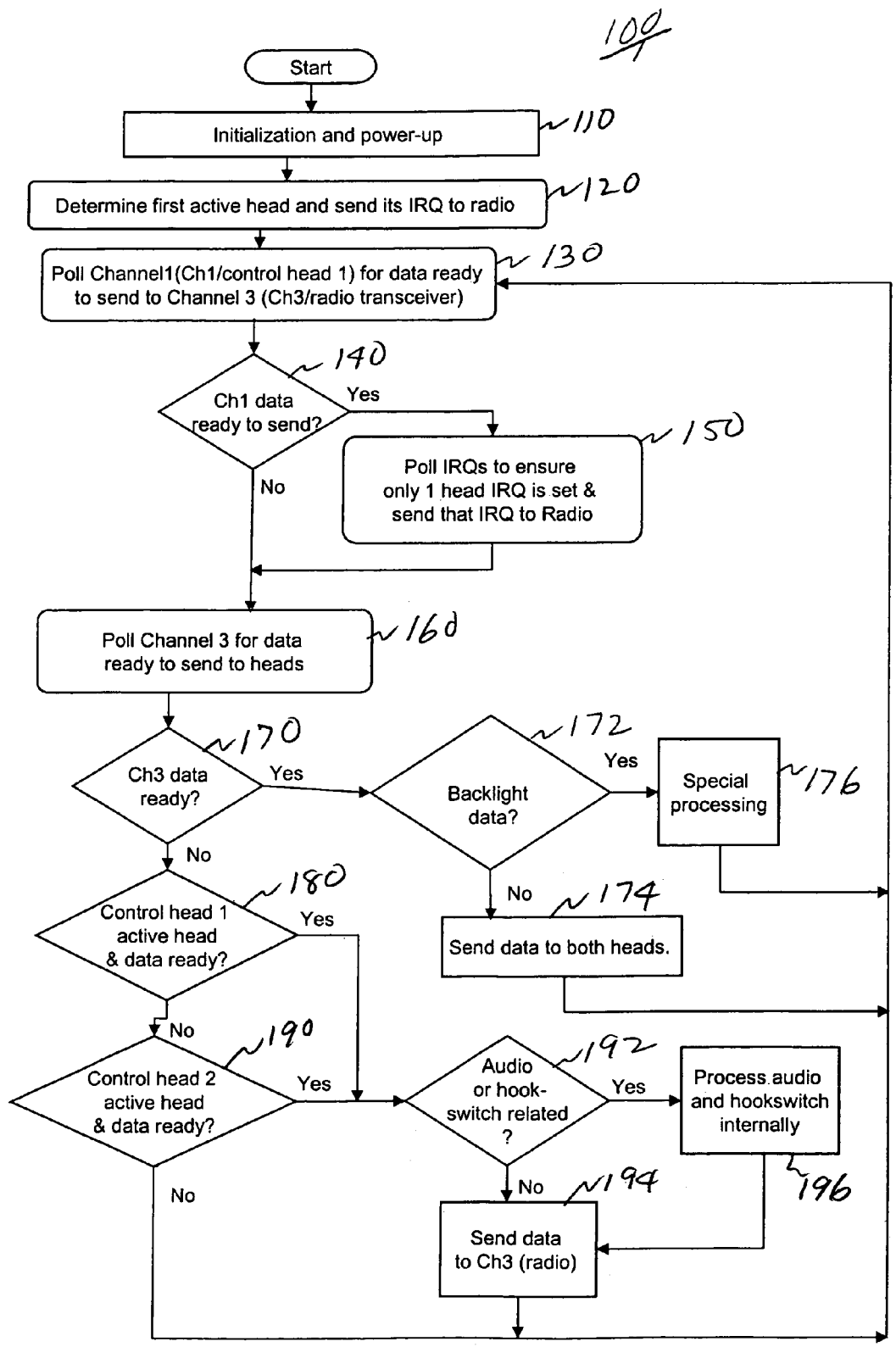
FIG. 6 is a flow chart showing a method according to an embodiment of the present invention.

The method and corresponding apparatus will now be described in more detail with regard to the FIGS. 3–8. FIG. 6 is a flow chart illustrating an exemplary high level representation of a process steps according to an embodiment of the present invention. FIGS. 7A–7I are flow charts illustrating details corresponding to the high level process steps in FIG. 6.

In FIG. 6, a method 100 illustrates an embodiment of the overall process for the interface module 60 connected between a radio transceiver 32 and a plurality of control heads 14, 16. For the preferred embodiment, two control heads 14, 16 are connected to the interface module 60. The method and corresponding interface module according to the preferred embodiment of the present invention mediate control of the radio transceiver 32 between the control heads 14, 16 by selectively enabling one of the control heads to operate the transceiver 32 at any one time. Each of the plurality of control heads periodically generates an interrupt request as a function of user actions at the control head. As a function of these requests, the interface module acts in response to selectively enable one of the control heads to operate the transceiver. The method also provides for each of the control heads to be selectively forwarded status messages originating from the radio transceiver in order to display the current radio status. The method according to an embodiment of the present invention will be described in more detail below.

Figure 7A:
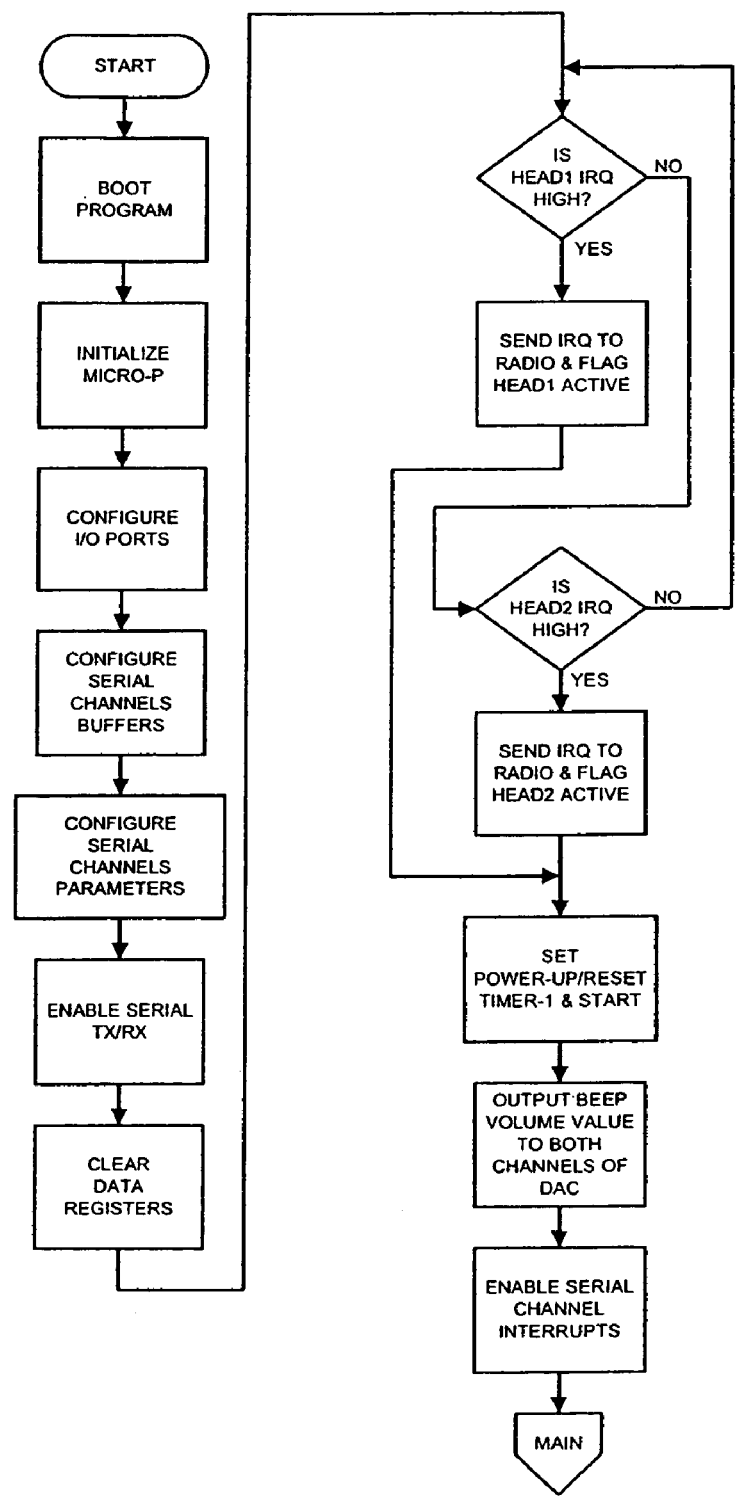

In Step 110 of FIG. 6, the process initializes the interface module upon power up. In one embodiment, the interface module 60 detects that the transceiver 32 has powered up by monitoring the "radio 5V" signal (shown in FIG. 4) which indicates whether the transceiver 32 is powered up. For Step 110, the interface module detects this power-up status and uses the signal to initiate the power up sequence of the interface module 60. The interface module 60 then initiates communication with the transceiver 32 and with the control heads 14, 16. At Step 120, in response to the interrupt request state of the control heads 14, 16, a determination is made as to which of the control head 14, 16 is to be designated as the "active" control head. The control heads 14, 16 set a corresponding interrupt request line, shown as IRQ1 and IRQ2 respectively in FIG. 4, in response to a user action (e.g., a switch action) at the control head. The control head must send one or more data messages to the transceiver 32 in order for the action to be serviced for operating the transceiver and maintaining the status. The interface module 60 enables the "active" control head to operate the transceiver 32 until such time as the required data transmission completes. FIG. 7A shows the detailed process steps to implement Steps 110 and 120. For a preferred embodiment, to determine the first active head the IRQ of control head1 (shown as IRQ1 in FIG. 5) is checked first as shown in FIG. 7A.

As shown in FIG. 6, at Step 130, the interface module 60 polls the serial communication channel 1 (also referred to herein as "channel 1" or "Ch1") to determine if control head 1 has data ready to send to the transceiver 32. At Step 140, if channel 1 has data ready to send then the process proceeds to Step 150. At Step 150, all IRQs are polled and if both heads IRQs (e.g., IRQ1 and IRQ2 in FIG. 5) are set then an internal timer is used to set a timeout period, preferably four seconds, to allow that condition to be resolved. After the timeout period, the IRQs are polled again. Exemplary details of Step 150 are shown in FIG. 7C. Once it is determined that both IRQs are not set then, if one of the control heads IRQ is set, that IRQ is sent to the radio transceiver 32 and the corresponding control head is set as the active control head. As shown, control head1 is checked first, so that if that head has set its IRQ active (e.g. high) then it becomes the active control head. If control head 2 has set IRQ high then it becomes the active control head. At Step 150, the control heads volume settings are also initialized. The volume control will be discussed in further detail below. After Step 150 is completed, the process proceeds to Step 160.

In operation, although data is generally transferred from the radio transceiver 32 in response to a received interrupt service request from a control head, typically transceiver 32 also periodically sends data to the control heads that is not in response to an interrupt service requests originating from a control head. For instance, a message to update the signal strength indicator on the control head display is sent from the radio transceiver 32 in response to changing signal conditions independent of any operator actions on the control heads. Thus, at Step 160, the interface module 60 polls the serial communication channel 3 (also referred to herein as "channel 3" or "Ch3"), corresponding to the radio transceiver 32, independently of the interrupt service requests to ensure that the control heads are updated in a timely manner. Thus, as shown in FIG. 6, the process proceeds to Step 160 where channel 3 is polled. The process proceeds to Step 170, where it is determined from the polling of channel 3 whether there is data message ready to send from the radio transceiver 32.

Figure 7B:
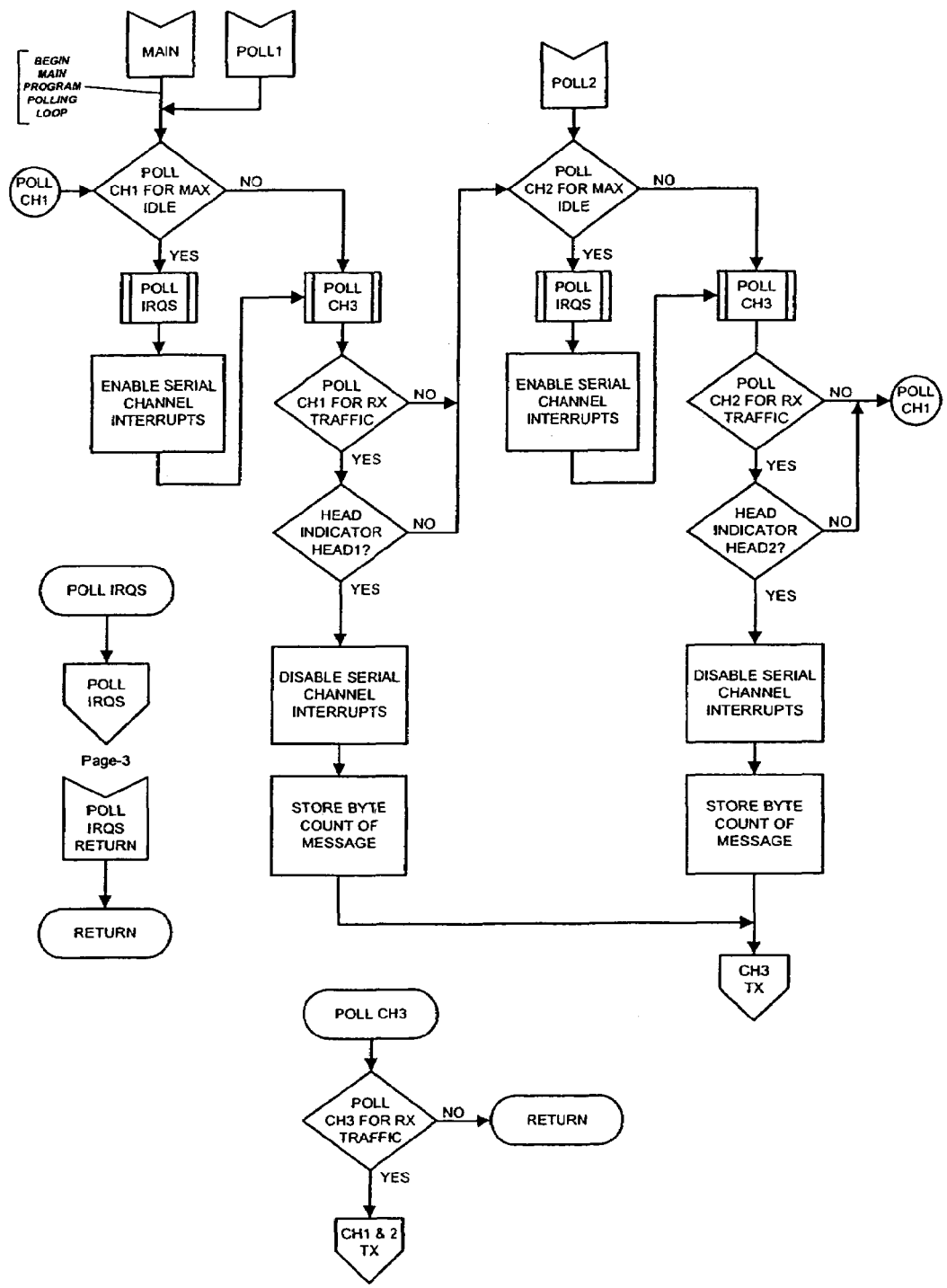
Figure 7C:
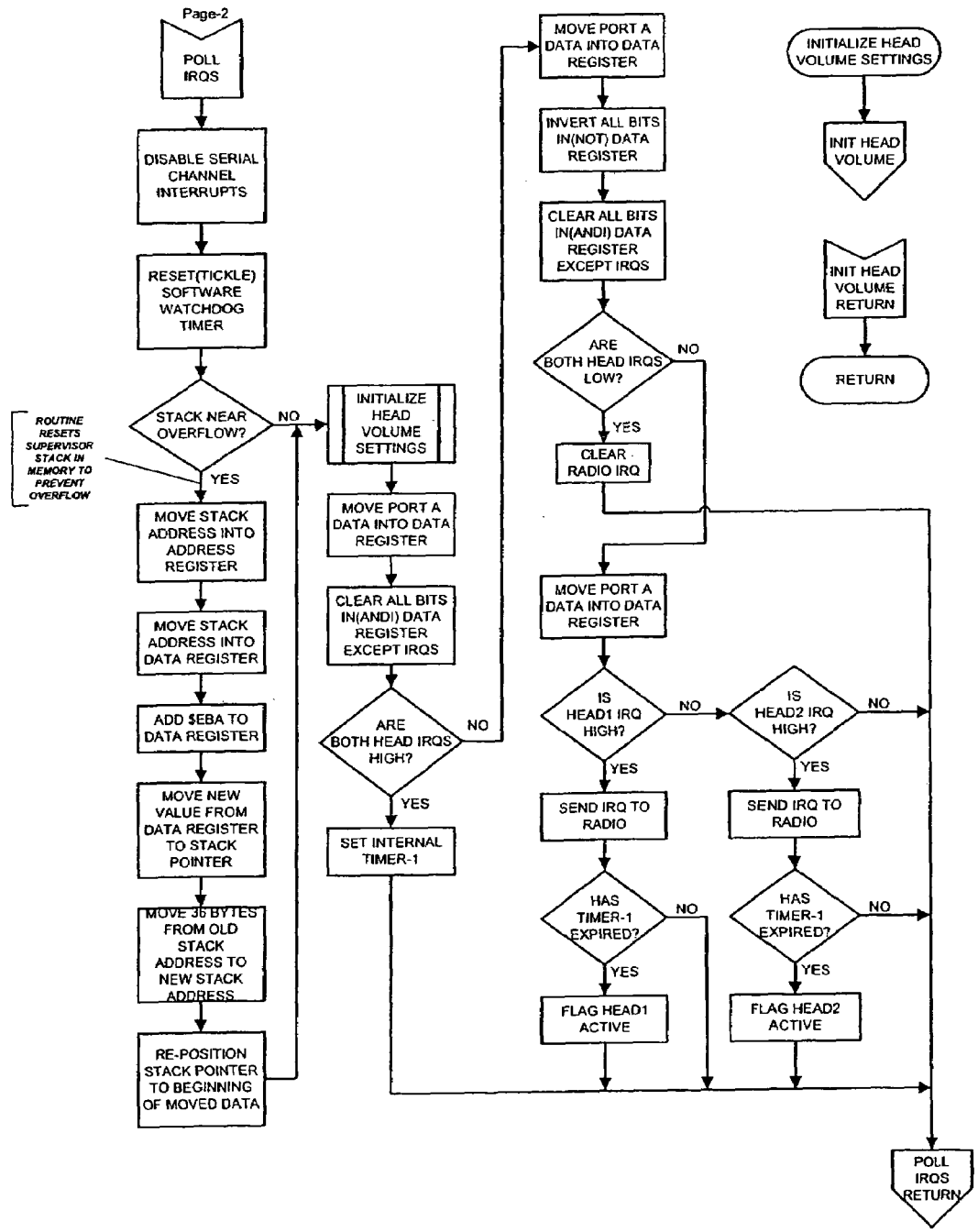
Figure 7D:
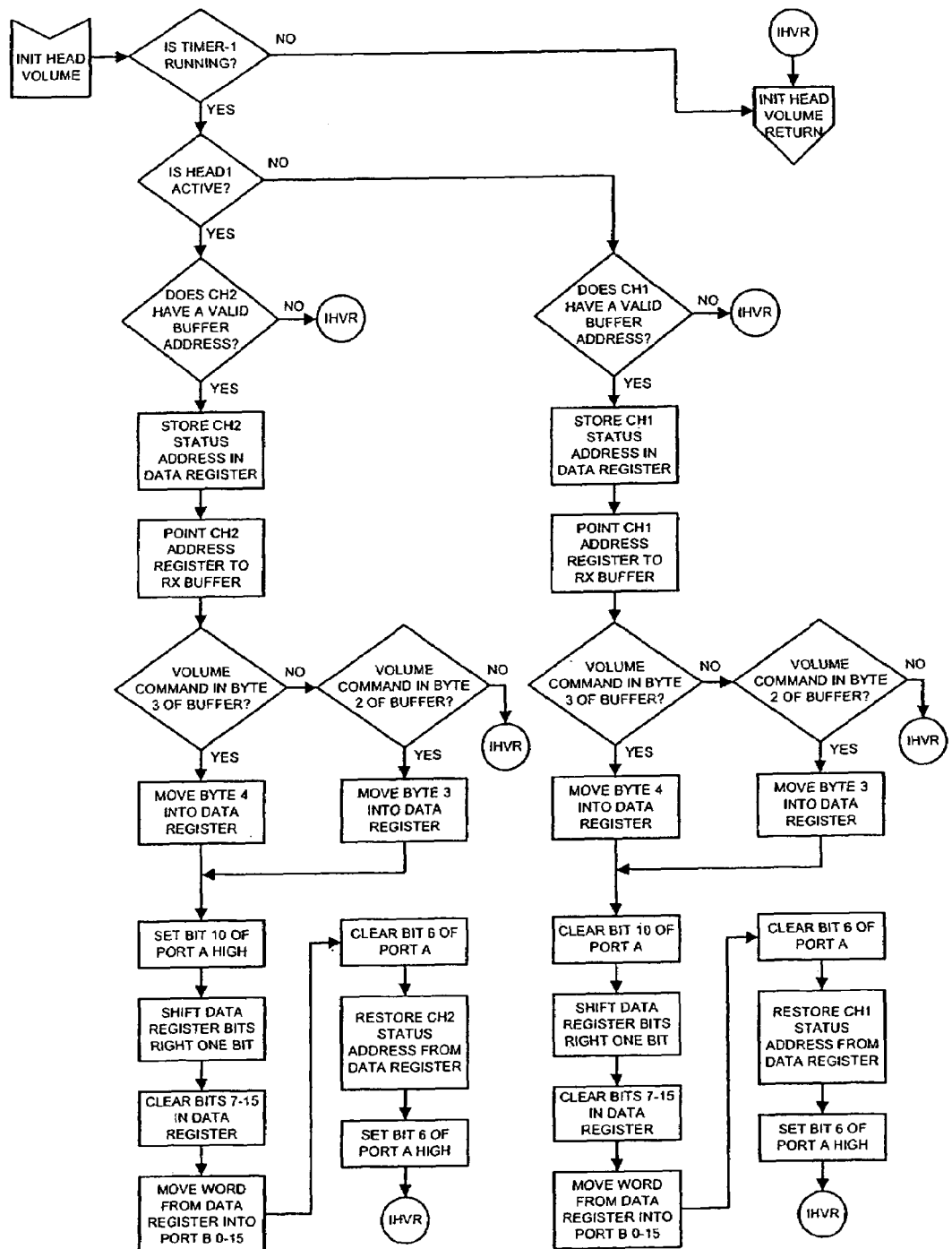

Exemplary details for Steps 160 and 170 are shown at the bottom of FIG. 7B, where channel 3 is polled for RX traffic which would indicate that the transceiver 32 has data ready to send to the control heads. Referred to FIG. 6, if there is no data ready to send from the transceiver 32 (corresponding to channel 3) to the control heads, then the process proceeds to Step 180 where control head1 is checked for active state and data ready. If control head 1 (corresponding to channel 1) is not "active" or has not data ready to send then the process proceeds to Step 190 where control head 2 (corresponding to channel 2) is checked similarly. If control head2 is not active or does not have data ready then the process returns to Step 130 as shown in FIG. 6.

At Step 170, if it is determined from the polling of channel 3 that there is data message ready to send from the radio transceiver 32, then the process proceeds to Step 172. For a system, as shown in FIG. 2, having a single control head 14 and a radio transceiver 32 designed for use with only that single head, data messages from the radio transceiver 32 for the control head are all sent to the single control head 14. For example, the user at the single control head 14 may press a button 22 to adjust the display 20 backlighting to improve readability as the lighting conditions change. To process this action, the control head 14 sets an interrupt service request and, after acknowledgement of the request is received from the radio transceiver 32, the control head 14 transmits an appropriate message to the radio transceiver 32 to indicate this button action. In response, the radio transceiver 32 sends a display backlight control message to the control head 14. Upon receipt of this message, the control head adjusts the display backlighting accordingly. For the present invention, the interface module 60 enables two control heads to operate with the radio transceiver 32 designed for use with a single head. The control heads are typically operated by different users at different locations having different ambient light conditions. Thus, it is desirable to change the display backlighting for the requesting control head only (e.g., only for the control head where a user requested a backlighting change).

Figure 7E:
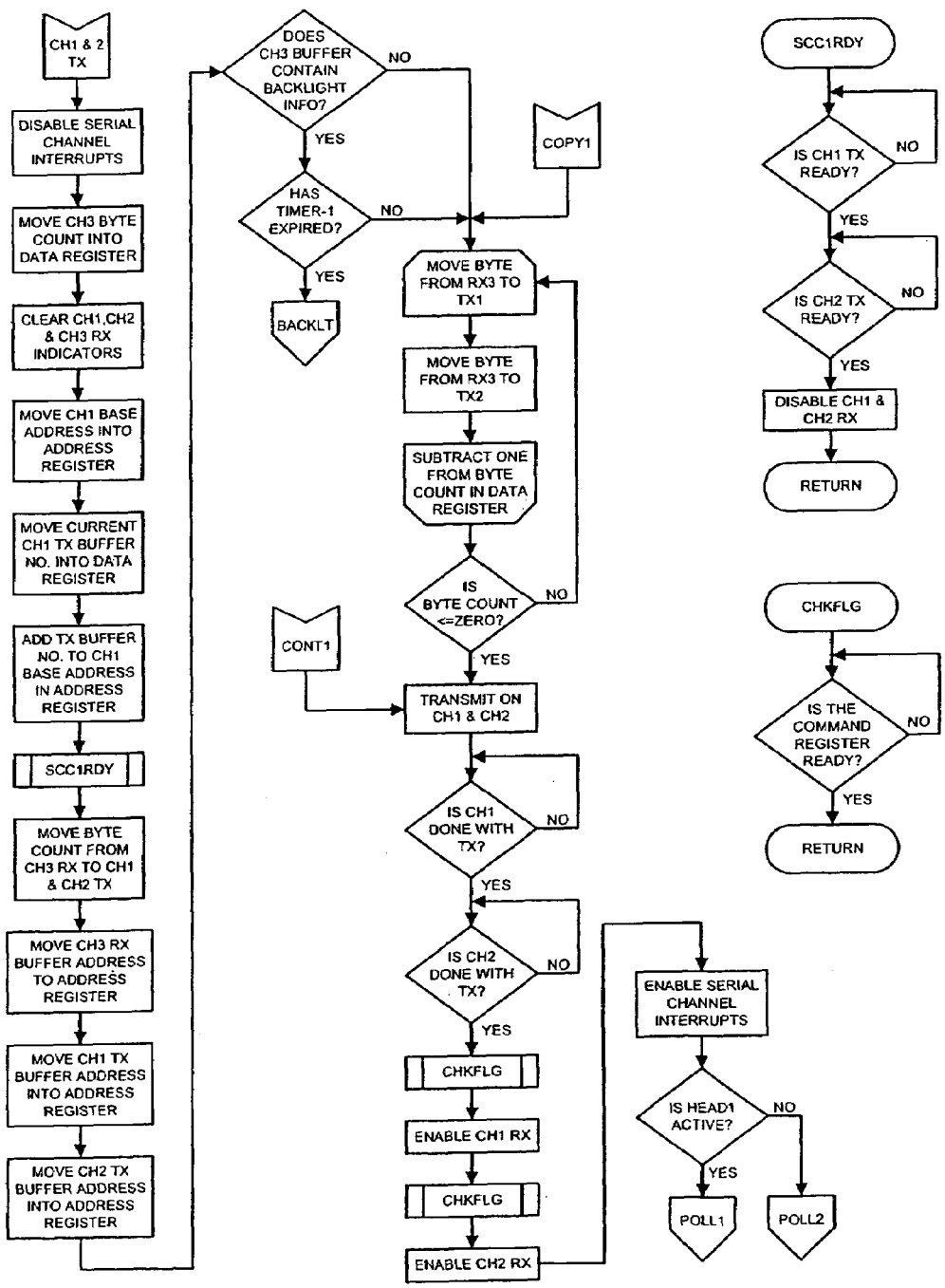
Figure 7F:
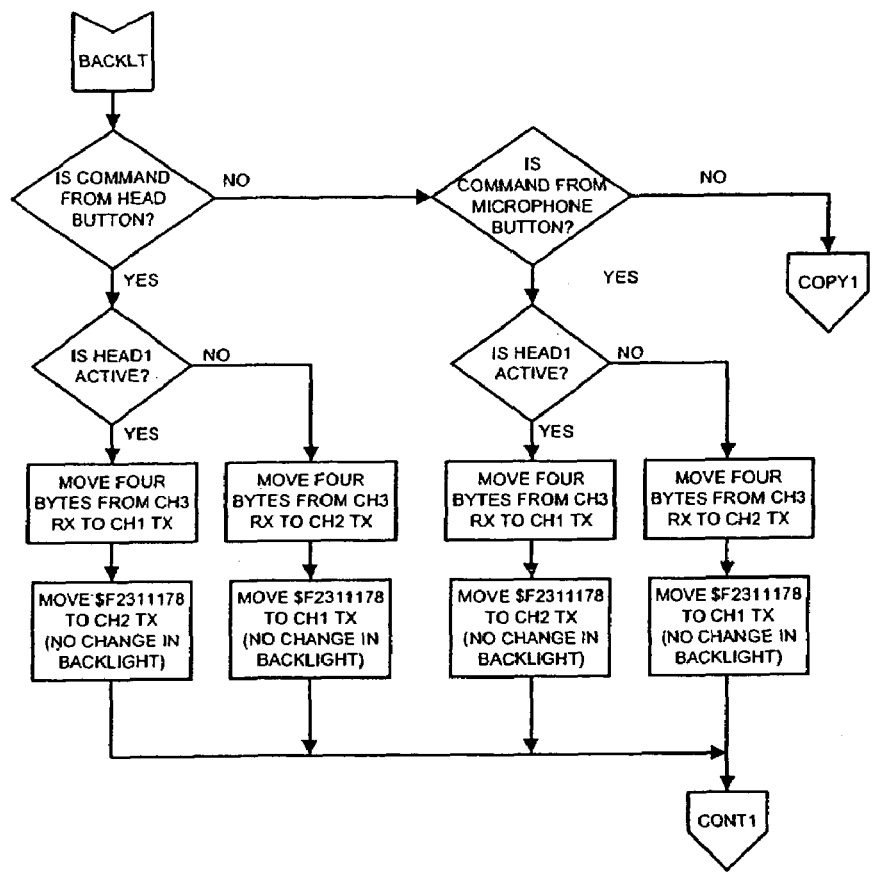

As shown in FIG. 6, in Step 172, the data message from the radio transceiver 32 on serial communications channel 3 is checked to determine if it is a backlighting data message. If in Step 172 this data message is determined not to be a backlighting data message, the process proceeds to Step 174 and the message is sent to both control heads and the process returns to Step 130. If this data message is a backlighting data message, then the process proceeds to Step 176 for special processing. For the special processing at Step 176, the method enables individual backlighting adjustment of each control head from a button on the control head or a microphone keypad button. This special processing for backlighting is shown in further detail in FIGS. 7E and 7F. For the method of the present invention, all initial backlighting information is sent to both control heads to a predetermined setting during the power up sequence at Step 110 in FIG. 6. This initial backlighting setting is typically preprogrammed into the radio transceiver 32 by the user. For the special processing at Step 176, the method confirms that the power-up sequence has ended (by checking for expiration of a timer as shown in FIG. 7E), after which each control head is sent an individual backlighting message. Regardless of which action is used to request the adjustment on a particular control head, the same backlighting message is sent by the interface module 60 only to the requesting control head. The interface module 60 sends a backlighting no-change message to the other, non-requesting control head.

Referring to FIG. 6, if at Step 180 it is determined that the control head1 is "active" and has data ready to send, then the process proceeds to Step 192. Otherwise, the method proceeds to Step 190, where a similar check is made for control head2 (corresponding to channel 2). If control head2 is active and has data ready to send, then the process proceeds to Step 192. At Step 192, the data message from the active control head is checked to determine if the message is audio or hookswitch related. If this data message does not fall within these two categories, the process proceeds to Step 194 whereupon the message is sent to the radio and thereafter the process returns to Step 130. If at Step 192 it is determined that the data message from the active control head contains audio volume control or hookswitch information, then the method proceeds to Step 196 for processing of this information accordingly.

Figure 7G:
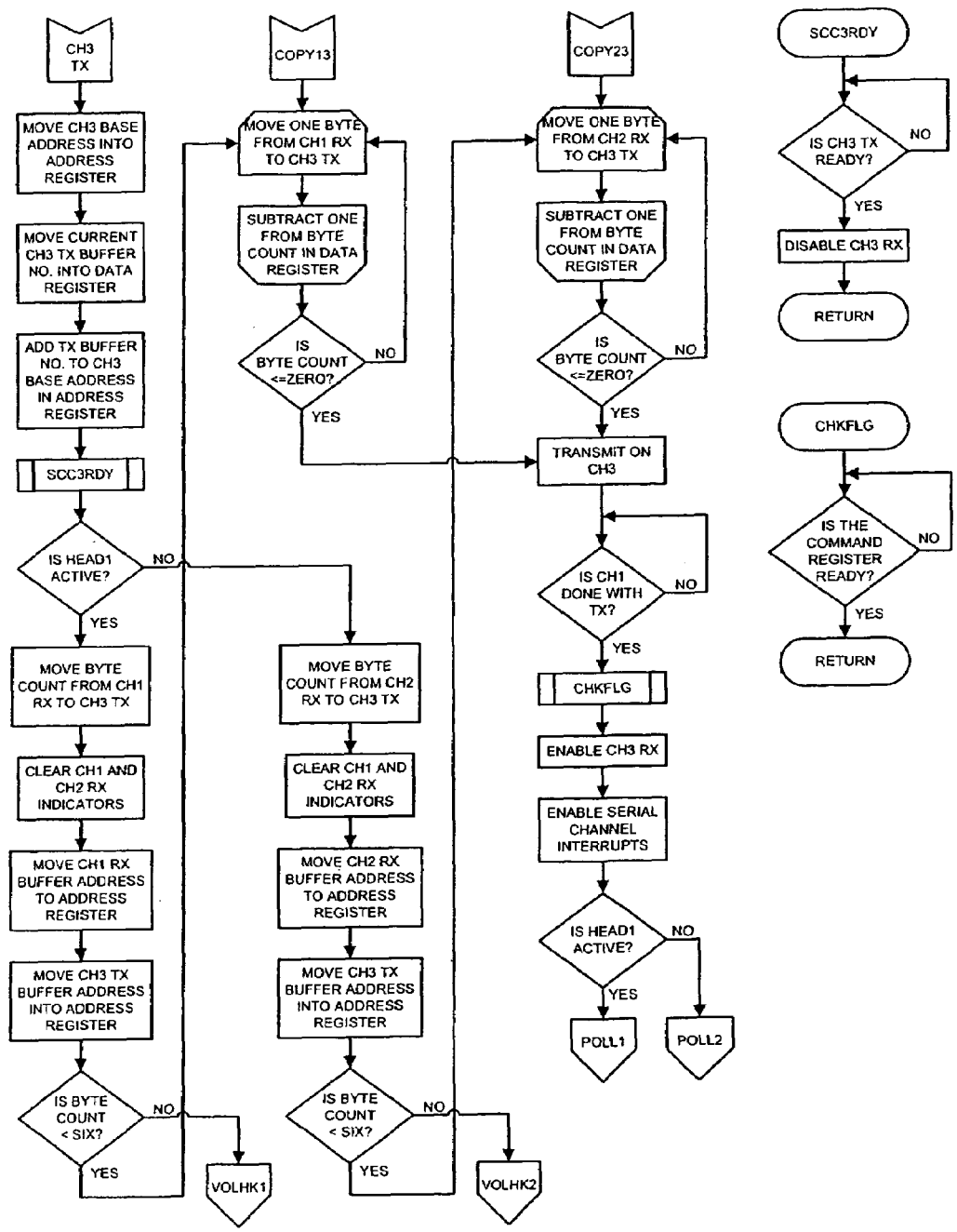
Figure 7H:
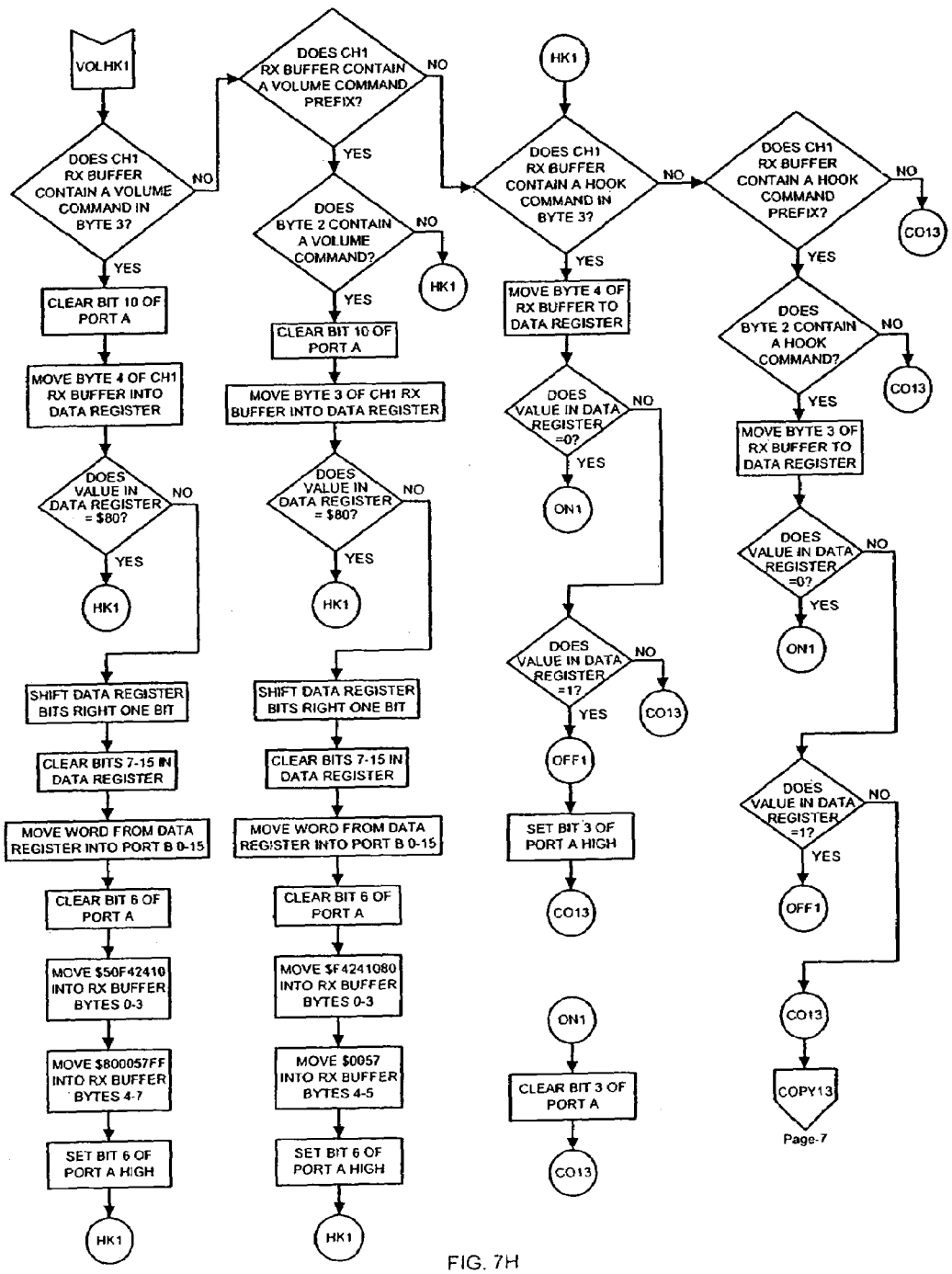
Figure 71:
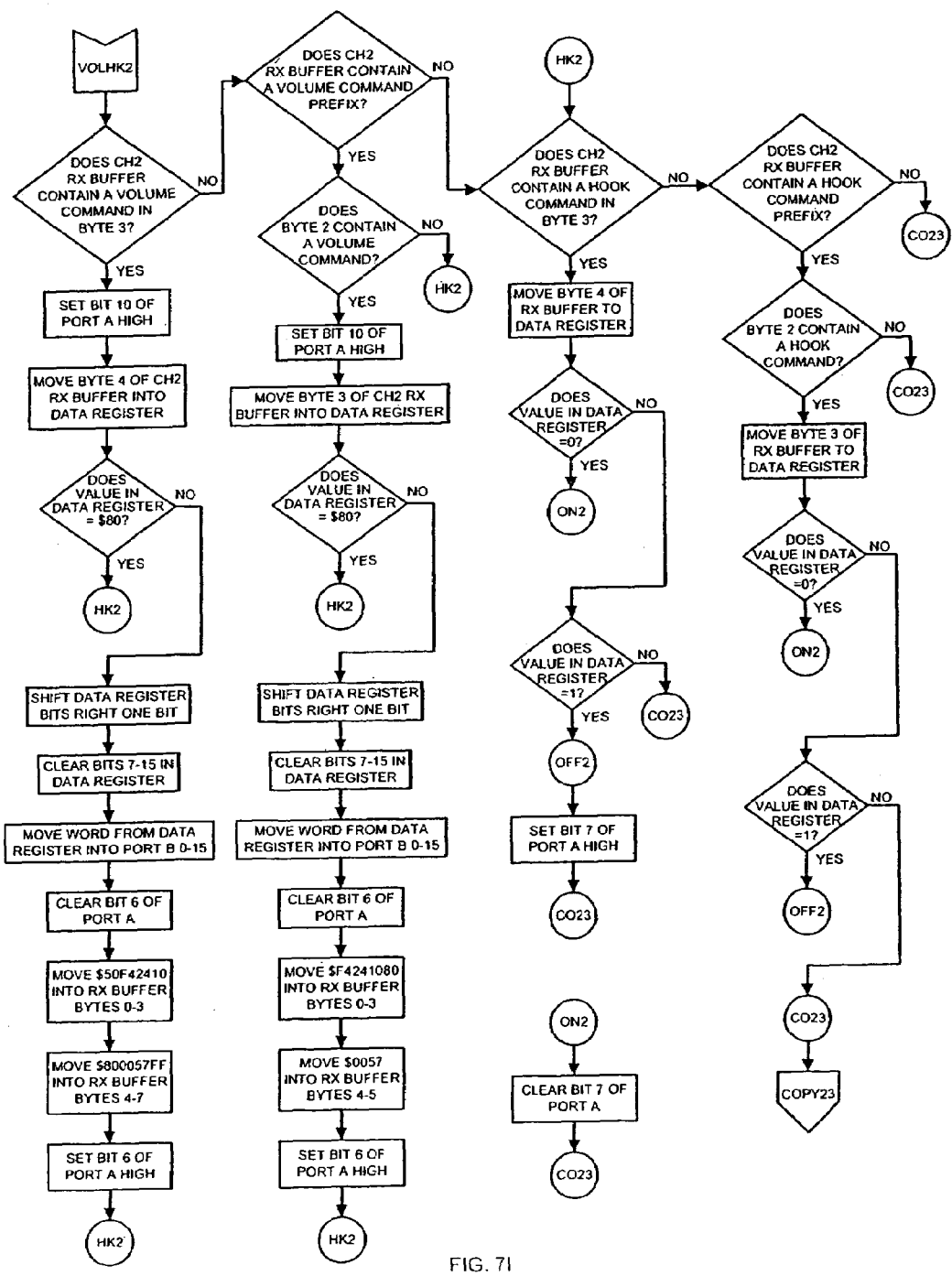

The details for Steps 192, 194 and 196 for an exemplary embodiment of the present invention are as shown in FIGS. 7G–7I, for control head 1 and control head 2 respectively. As shown in FIGS. 7G–7I, for this exemplary embodiment, the detailed sequence is as follows; the byte count of the message is checked to determine if the message length is six bytes or longer which indicates that volume control or hookswitch information might be present. If the byte count is less than six then the message is forwarded immediately to the transceiver with no further processing. If the byte count is six or greater then the message is checked for volume control information. If the process does not detect volume control information, then it checks for hook-switch information. If no hook-switch information is detected, the message is forwarded to the transceiver with no further processing. Thus, for the method according to a preferred embodiment, at Step 192, there is always a check for hook-switch information if no volume (control) information was found in the message. If any volume information is found, the message is not checked for hook-switch information. The audio processing and the method of the present invention for processing audio are now described in further detail.

One of the advantages of the present invention is the processing of audio for the dual control head system shown in FIG. 3 having a radio transceiver designed to operate with a single head. For audio control, it is highly desirable to adjust the audio volume only for the speaker associated with the control head at which the volume control setting was changed. The control heads of mobile radio systems typically include a volume control (e.g., on/off/volume control knob 18 shown in FIGS. 1–3) for adjustment of the volume level and an audio speaker integrated into the head. Known radio systems may optionally provide a telephone-style handset or other device having an integrated speaker and being connected directly to the control head, alternatively by wireless means, to enable voice communication.

A known higher tier mobile radio system having two control heads has the drawback of requiring an additional external amplified speaker, having a volume control mounted thereon, to provide audio for one of the two control heads. For this known system, the audio fed to this external speaker's amplifier is derived from a constant level audio source. A user of this known system is required to access the area where this speaker is mounted, external to the control head, in order to adjust the audio volume control for the speaker for one of the control heads. The method according to embodiments of the present invention has the additional advantage of enabling use of the volume control and speaker integrated with each control head and not requiring an additional speaker. In an alternative embodiment, the method and system enables use of an optional additional speaker, while allowing the audio level of this speaker to be adjusted by the corresponding control head volume control knob.

The interface module and corresponding method controls the volume of each of the control heads audio output, as will now be described in further detail. In operation, the control head sends a data message when the volume control is rotated. For the active head, the interface module retrieves the volume control position value from this message and, if it is not the fixed reference level discussed above, feeds it to seven of its processor's programmable signal ports to form a seven-bit word. For the process, an additional bit is sent out of another port of the processor of the interface module to select one of two channels on a dual channel digital-to-analog converter (DAC). A block diagram of one embodiment of the audio circuit in FIG. 4 is shown in FIG. 8. The two outputs of the DAC channels are sent to a dual dc-gain-controlled amplifier stage that controls the level of audio to each control head speaker. In addition, control is provided to shutdown the amps during power on. There is also a muting control in the audio circuit for muting the speakers as needed as will be described in further details below.

Referring again to FIG. 6, for the processing in Step 196, a check is first made to determine if the data message ready to be sent from the active control head contains an audio volume control command. If the data message does contain the audio volume control command, then a further check is made before the data is processed. This check in Step 196 will now be described in further detail.

For the exemplary mobile radio system in FIG. 2, when the radio transceiver 32, designed for a single control head, receives a message indicating that a button has been pressed on a control head, the transceiver 32 sends a message to the control head requesting the current volume control setting. After receiving the setting information, the transceiver preferably sends a message to the control head for activating a beep tone at the current volume setting. This tone serves as an acknowledgment of the action to the user at the control head. For the method according to embodiments of the present invention, the interface module 60 maintains the particular volume control settings for the control heads. The interface module 60 sends messages to the transceiver 32 to indicate a fixed reference volume setting, e.g. level 80, for the single control head that the transceiver 32 is designed to operate with. As a result, for the processing at Step 196 of FIG. 6 (as shown in detailed FIG. 7H) if the radio transceiver 32 has sent a volume control message containing a setting at that fixed reference level to a control head, e.g. 80, then the corresponding volume command message from the control head is ignored. Thus, for the method according to embodiments of present invention, the volume is controlled for speakers corresponding to a particular control head such that the volume level for the speakers corresponds to the volume control setting for that control head, separate from any levels sent from the radio transceiver 32. For Step 196, if the volume control command from the control head is set at a level different than the fixed reference level set by the radio, then the volume control message is not ignored and is processed accordingly.

If the data message checked at Step 192 in the embodiment shown in FIG. 6 is a hookswitch command, then the method of the present invention performs special hookswitch processing as will now be discussed in further detail. As shown in FIG. 3 for an embodiment of the current invention, control heads 14, 16 includes an integrated speaker 28 to provide audio to an operator. The input device 24 may also provide a microphone and an audio speaker integrated as part of a handset. The input device is typically enabled only for half-duplex operation by a user. This half-duplex operation provides a listen-only mode and a talk mode such that a user can talk or listen using the device, but cannot do both at the same time. A push-to-talk button (PTT) (not shown) is typically provided on the input device 24 to select between these modes, as will be described in further detail below.

The PTT button functions such that, when the button is pressed and held, the device operates in talk mode to enable audio input to the microphone to be transmit on the selected channel. When the PTT button is released, the input device transitions to a listen-only mode. A speaker privacy mode feature is also provided wherein a hookswitch control is provided on input device 24. For this privacy mode, audio output is disabled from the speaker 28 and is available through a speaker integrated in the input device 24. For example, an operator of the control head using a telephone style handset as the input device 24 (e.g., a paramedic assisting a patient in the patient area of an emergency vehicle) activates this privacy mode to enable him or her to listen to incoming audio on the handset speaker in privacy. For this privacy mode, the speaker on the control head is muted such that others (e.g., the patient) cannot monitor the audio communication. Referring to FIG. 6, for this aspect of an embodiment of the present invention, at Step 196, when the hookswitch command is detected an output is set or cleared by the method in order to mute or unmute the appropriate speaker amplifier. When the handset goes OFF hook, the speaker audio is muted, while the handset audio remains unmuted at the prior volume level setting. Thus, the method of the preferred embodiment of the present invention enables speaker privacy when using a handset with the control head. In Step 194, the data message is forwarded to the radio transceiver.

According to a preferred embodiment of the present invention, the interface module provides audio processing that the radio transceiver 32 had performed in the single control head system. As a result, for this speaker privacy aspect, instead of programming the radio transceiver for a handset, a switch is provided on the interface module 60 which a user sets to indicate whether a handset is to be used with the control head.

Typically, means is provided on a microphone input device, e.g., a hang-up clip, with the button on the microphone device being insulated from the rest of the microphone such that when the user hangs up the clip, there is a closed circuit between the button and other metal on the microphone, to indicate to the interface module that the user has hung up the microphone.

For the interface module 60 of the present invention according to the embodiment in FIGS. 4 and 5, one of ordinary skill in the art will appreciate that interrupt processing is utilized in order to detect the "data ready" state on serial communication channels 1–3 for the control head1, control head2, and radio transceiver. It is also know to one of ordinary skill in the art that the implementation of this internal interrupt processing will vary depending on the particular processor used.

The foregoing detailed description of the invention has been provided for the purposes of illustration and description. Although exemplary embodiments of the present invention have been described in detail herein with reference to the accompanying drawings, it is to be understood that the invention is not limited to the precise embodiments disclosed, and that various changes and modifications to the present invention are possible in light of the above teaching.

What is claimed is:

1. In a radio system including a transceiver designed to operate via a digital data bus with a single control head only, a method for modifying said radio system to enable a selected one of a plurality of control heads to operate said transceiver, each said control head periodically generating an interrupt request signal, comprising the steps of:
   connecting an interface module between said transceiver and said plurality of control heads;
   detecting in said interface module when one said control head has generated an interrupt request;
   causing said interface module to selectively enable the control head that generated said interrupt request to operate said transceiver, wherein the method is implemented using two control heads, comprising the steps of:
   processing said interrupt request;
   designating said requesting control head as the active control head and the other control head as the inactive control head;
   forwarding said interrupt request to said transceiver;
   receiving a message from said transceiver;
   forwarding said transceiver message to said control heads; including the steps of:
      decoding said transceiver message to determine if said transceiver message is a backlighting control message; and
      if said transceiver message is a backlighting control message, then
         forwarding said backlighting control message to said active control head; and forwarding a backlighting no change message to the other of said control heads, such that a backlighting change in said backlighting control message is received only by said active control head;

if said transceiver message is not a backlighting message, then forwarding said transceiver message to each of said control heads;

receiving data messages from said control heads in response to said transceiver message; and selectively forwarding said received data messages from said active control head to said transceiver, thereby enabling operation of said transceiver by said active control head.

2. In a radio system including a transceiver designed to operate with a single control head via a digital data bus, a method for enabling the use of a pair of control heads for operating said transceiver, comprising the steps of:

(a) providing an interface module connected between said transceiver and said pair of control heads, each of said control heads periodically generating an interrupt request;

(b) initializing said interface module;

(c) receiving one of said interrupt requests from one of said control heads;

(d) processing said interrupt request;

(e) designating said requesting control head as the active control head and the other control head as the inactive control head;

(f) forwarding said interrupt request to said transceiver;

(g) polling a first one of said pair of control heads to determine if said first control head has data ready to be transmit to said transceiver;

(h) if said first control head has data ready to be transmit, polling the interrupt requests from each of said control heads to ensure that only one of said control heads has an interrupt request currently active;

(i) sending said currently active interrupt request said transceiver;

(j) polling said transceiver to determine if said transceiver has data ready to be transmit to said control heads;

(k) if said transceiver has data ready to send to said control heads, checking said data to determine if said data contains a backlighting message;

(l) if said data from said transceiver does not contain said backlighting message, sending said data to each of said control heads;

(m) if said data from said transceiver contains said backlighting message; processing said backlighting message, wherein said processing includes:

(m1) sending said backlighting message to said active control head, (m2) sending a backlighting no-change message to said inactive control head; and (m3) then returning to step (g);

(n) if said transceiver does not have data ready, determining whether said first control head is the active control head and has data ready;

(o) if said first control head is either not the active control head or does not have data ready, determining whether the other control head is the active control head and has data ready and if said other control head is either not the active control head or does not have data ready, then proceed to step (g);

(p) if it is determined that one of said pair of control heads is an active control head with data ready, processing the data of said active control head, said processing comprising:

(p1) determining if said data contains audio or hookswitch information;

(p2) if said data does not contain audio or hookswitch information, sending said data to said transceiver and returning to step (g);

(p3) if said data does contain audio or hookswitch information, processing said information such that any change in audio volume as a result of said information occurs only for speakers corresponding to said active control head.

* * * * *